(12) United States Patent
Zhang et al.

(10) Patent No.: US 7,484,947 B2
(45) Date of Patent: Feb. 3, 2009

(54) COOLING AND MOLDING WATER TANK FOR A PLASTIC COMPLICATED PROFILE

(75) Inventors: Tingfu Zhang, Jiangsu (CN); Yunsheng Wang, Jiangsu (CN)

(73) Assignee: Lianyungang Jari Tooling Technology Co., Ltd., Jiangsu (CN)

( * ) Notice: Subject to any disclaimer, the term of this patent is extended or adjusted under 35 U.S.C. 154(b) by 0 days.

(21) Appl. No.: 10/566,960

(22) PCT Filed: Sep. 8, 2004

(86) PCT No.: PCT/CN2004/001031

§ 371 (c)(1),
(2), (4) Date: Jan. 27, 2006

(87) PCT Pub. No.: WO2005/023515

PCT Pub. Date: Mar. 17, 2005

(65) Prior Publication Data

US 2006/0240135 A1    Oct. 26, 2006

(30) Foreign Application Priority Data

Sep. 8, 2003 (CN) ............................ 03 2 78474

(51) Int. Cl.
*B29C 47/90* (2006.01)

(52) U.S. Cl. ............. 425/71; 425/326.1; 425/384; 425/388

(58) Field of Classification Search .......... 425/68, 425/70, 71, 326.1, 384, 388; 264/209.3, 264/209.4, 209.5

See application file for complete search history.

(56) References Cited

U.S. PATENT DOCUMENTS

| | | | | |
|---|---|---|---|---|
| 3,538,210 A | * | 11/1970 | Gatto | 425/71 |
| 3,717,426 A | * | 2/1973 | Tucking et al. | 425/71 |
| 5,505,058 A | * | 4/1996 | Dorninger | 425/71 |
| 5,514,325 A | * | 5/1996 | Purstinger | 264/560 |
| 5,780,071 A | * | 7/1998 | Racioppi et al. | 425/384 |
| 6,066,288 A | * | 5/2000 | Purstinger | 425/71 |
| 6,244,847 B1 | * | 6/2001 | Wegmaier et al. | 425/71 |
| 6,394,782 B1 | * | 5/2002 | Grassi | 425/326.1 |
| 6,620,354 B1 | * | 9/2003 | Bessemer et al. | 264/40.6 |
| 2003/0219503 A1 | * | 11/2003 | Kossl | 425/71 |

* cited by examiner

*Primary Examiner*—James Mackey
*Assistant Examiner*—Joseph Leyson
(74) *Attorney, Agent, or Firm*—Mayer & Williams PC; Karin L. Williams, Esq.

(57) ABSTRACT

The invention concerns a cooling and molding water tank for a plastic complicated profile. A plurality of molding blocks and water collection plates are provided along the length inside the tank, and they are spaced each other. The advantage of this invention is that: the cooling water flows alternately in cycle or periphery-inner-periphery. It makes the complicated profile cool homogeneously and efficiently upon the high speed extrusion pulling and provides the profile with good molding effect and quality.

19 Claims, 4 Drawing Sheets

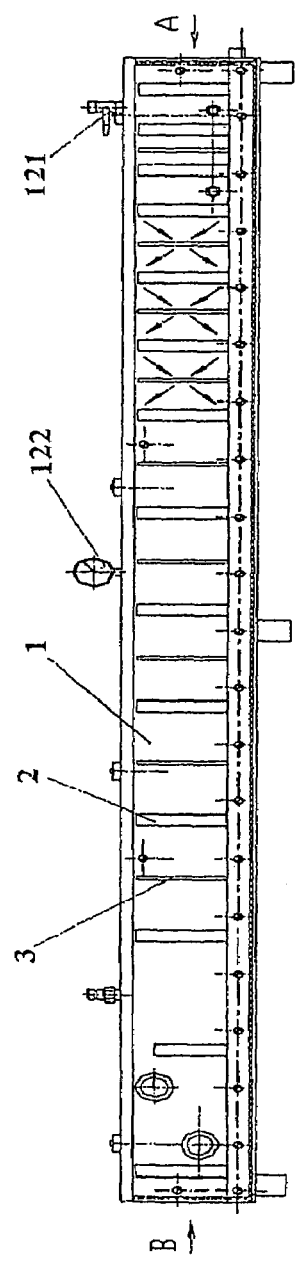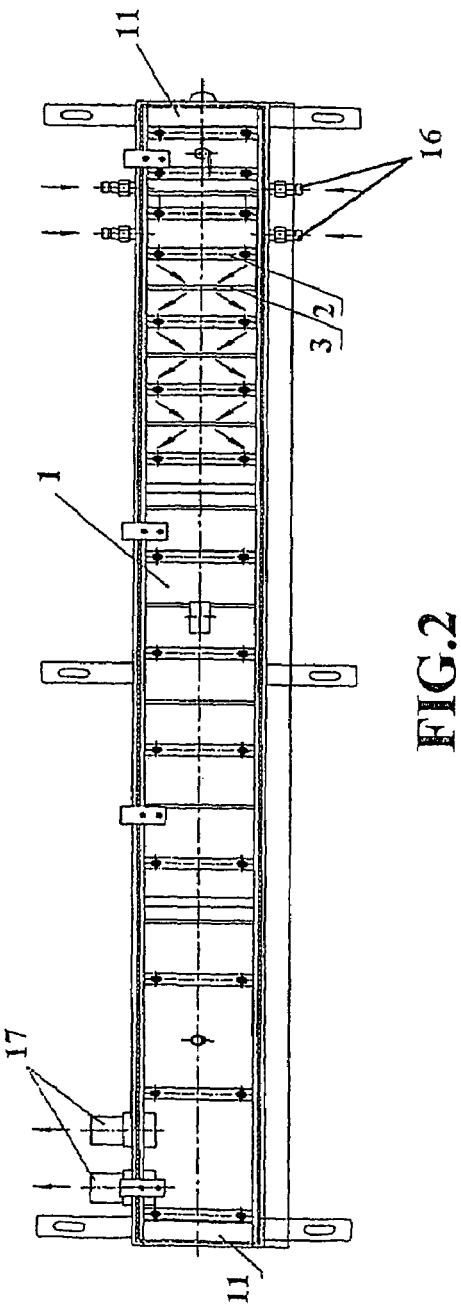

COOLING AND MOLDING WATER TANK FOR A PLASTIC COMPLICATED PROFILE

TECHNICAL FIELD

This invention relates to a cooling tank for extrusion of a plastic complicated profile, and particularly to a cooling and molding water tank for extrusion of a plastic complicated profile for the purpose of cooling and molding of various kinds of plastic complicated profiles manufactured in a continuous manner.

BACKGROUND

Molding die structures for extrusion of plastic complicated profiles have been developed from entirely dry molding structures in the earlier time to molding structures with the combination of dry and wet states, so that a manufacturing speed of plastic profiles is greatly increased. As a dispensable part of the whole system of an extrusion die, a cooling water tank plays a more and more important role in strengthening the cooling effect of plastic profiles, increasing the extrusion speed, and keeping the intrinsic quality of plastic profiles. Presently, extrusion die is developed to have higher speed and better performance. A cooling water tank of plastic complicated profiles, such as Chinese Patent of Utility Model "a molding and cooling mechanism for extrusion of a plastic complicated profile" (Patent No. ZL01237399.0, Announcement No. CN2472911Y) and Chinese Patent of Utility Model "a molding die mechanism for a plastic complicated profile" (Patent No. ZL0322110.0, Announcement No. CN2594001Y), is processed and provided with a water slot or a water hole in locations where a molding block approaches a profile cavity plate inside a water tank, in order to homogeneously cool a local part of a profile or obtain eddy flow of the cooling water. Although both mechanisms mentioned above overcome the defect of poor heat exchange in dry molding structures, the cooling ability still remains restricted. Obviously, the existing molding and cooling mechanisms cannot meet the needs for high speed and excellent efficiency of an extrusion die. As shown in Chinese Patent of Utility Model "a cooling water tank for the production of a plastic complicated profile" (Patent No. ZL01262430.6, Announce No. CN2491214Y), which provides with a cooling water tank which is disposed with a set of molding plates inside the tank body of a water tank, said set of molding plates are arranged so that they are spaced more and more away from each other from an inlet to an outlet of the water tank. In this way, the manufacturing cost of a water tank is reduced, however the problems of homogeneously cooling of the profiles and promoting cooling efficiency still exist. Therefore, it has become one of urgent technical problems to be solved in the technical field to develop a new cooling and molding water tank with better cooling ability and cooling characteristics of high efficiency and homogeneity.

SUMMARY OF THE INVENTION

The invention aims to overcome the defects and shortcomings existing in the prior art, and provide a cooling and molding water tank for continuous extrusion of a complicated profile, in order to promote the cooling efficiency and the cooling homogeneity during the extrusion of a plastic complicated profile, and sufficiently guarantee the efficiency and quality of a profile molding during a high speed extrusion.

To obtain the objects mentioned above, it is provided a cooling and molding water tank for extrusion of a plastic complicated profile, comprising a tank body, said tank body including front and rear end blocks, a top cover of, two side plates, a bottom plate and a plurality of foot plates which are in bolted or hinged joint. An inlet pipe is provided on the side plate near the front end block, and an outlet pipe is provided on the side plate near the rear end block. A vacuum valve and a vacuum, gauge are provided on the top cover. A plurality of molding blocks and water collection plates are provided along the length direction inside the tank body, said molding blocks and water collection plates being spaced from each other, and the intervals therebetween becoming wider from the front end to the rear end.

Said molding blocks and water collection plates are inserted into a receptacle at the internal side of the side plates of the water tank, which have a limited freedom of motion in the longitudinal, transverse and vertical directions.

The number of said molding blocks is 5-30.

The number of said water collection plates is 3-28.

U-shape water passage slots are provided on the four peripheral sides of said molding blocks.

The width of said U-shape water passage slot is 0.2-0.8 of the side length of said molding block, the depth of which is ranged 2-15 mm according to the size of the molding blocks.

An adjusting mechanism is provided on the long side of the profile cavity passage of said molding block. The adjusting mechanism includes a through kurf which is parallel to and 1-8 mm from the plane of the long side of the profile cavity passage, and at least one through screw hole which is provided on and perpendicular to the plane of the long side and intersects with the low side of the kurf, wherein an adjusting screw is engaged with the screw hole and the top of the adjusting screw may extend against the upper side of said kurf.

The width of said kurf is 0.1-2.0 mm, and the length of said kurf is equal to that of the long side of the profile cavity passage, or a little longer or shorter.

The shape of an internal cavity of said water collection plate is the shape of an outwardly expanded section of a plastic complicated profile which expands 0.5-8 mm in the radial direction. The shape of some parts of the internal cavity where are overlapped, adjacent, or complicated can be simplified.

Said water collection plates can be made of stainless steel, alloy aluminum, organic glass, or other stainless and corrosion resistant materials.

The advantages of the invention is that, by using a water collection plate and incorporating a molding block with a novel structure, the water flow state is changed and form a special alternate cycle flow of cooling water so as to accelerate the heat exchange between a profile and the cooling water. In contrast to the prior art, very high cooling efficiency and very good cooling homogeneity is obtained and the efficiency and quality of a profile molding during a high speed extrusion is guaranteed.

BRIEF DESCRIPTION OF THE DRAWINGS

FIG. 1 is a front view of an embodiment in accordance with the invention;

FIG. 2 is a top view of an embodiment in accordance with the invention;

DESCRIPTION OF THE REFERENCE NUMBERS IN THE DRAWINGS

1—tank body
11—front end block and rear end block
12—top cover
121—vacuum valve
122—vacuum gauge
13—side plate
14—bottom plate
15—foot plate
16—inlet pipe
17—outlet pipe
2—molding block
21—U-shape water passage slot
22—adjusting mechanism
221—kurf
222—screw hole
223—adjusting screw
3—water collection plate
31—internal cavity

DETAILED DESCRIPTION

An embodiment of the present invention will be described by reference to the following detailed description of an embodiment in accordance with the present invention when taken in conjunction with the accompanying drawings.

Figure 3:
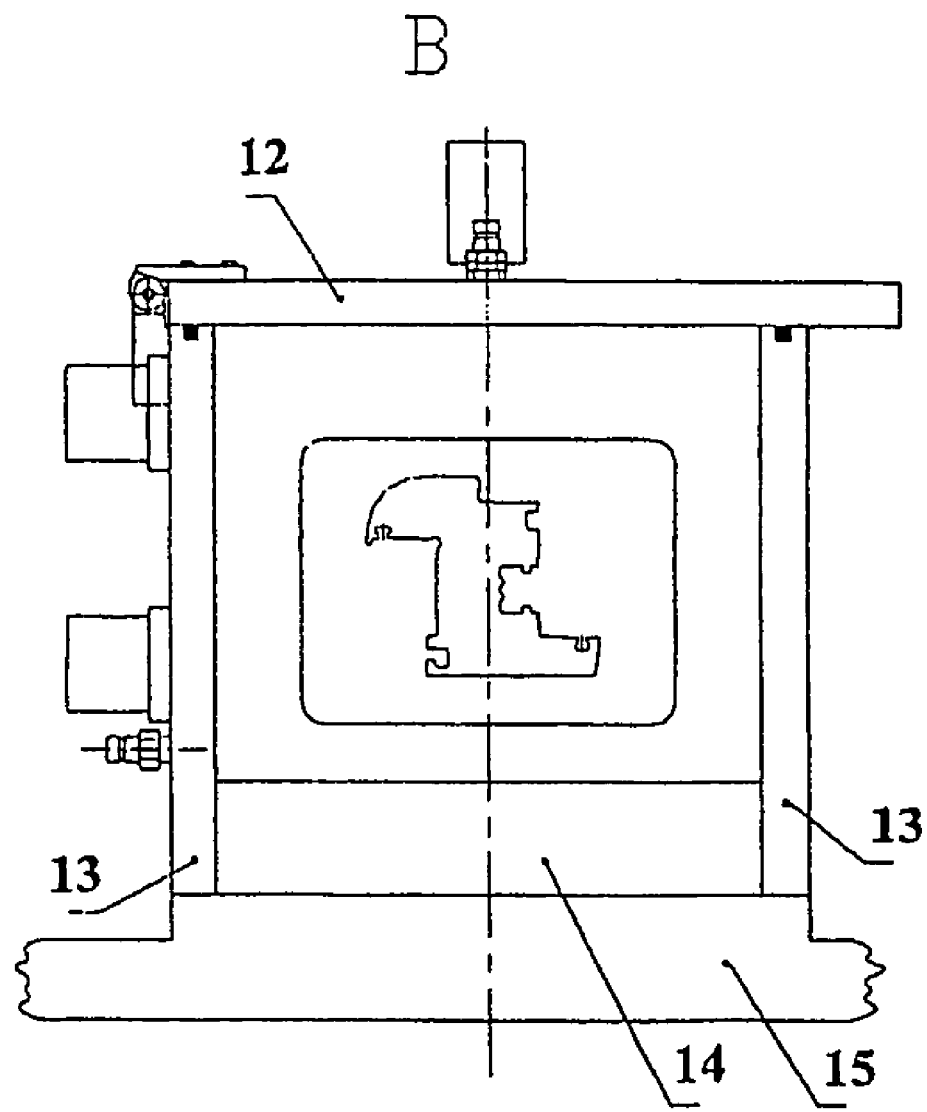
FIG. 3 is a left view of in the direction of B shown in FIG. 1 in accordance with the invention.

As shown in FIGS. 1, 2 and 3, which are respectively a front view, a bottom view and a left view in the B direction according to an embodiment of the invention, a cooling and molding water tank for extrusion of a plastic complicated profile includes a tank body 1 including front and rear end block 11, top cover 12, two side plates 13, a bottom plate 14 and a plurality of foot plates 15 which are in bolted or hinged joint. An inlet pipe 16 is provided on the side plate 13 near the front end block 11, and an outlet pipe 17 is provided on the side plate 13 near the rear end block 11. A vacuum valve 121 and a vacuum gauge 122 are provided on the top cover 12. A plurality of molding blocks 2 and water collection plates 3 are provided along the length direction inside the tank body 1, said molding blocks and water collection plates being spaced from each other, wherein the intervals therebetween becoming wider from the front end to the rear end.

As shown in FIGS. 1 and 2, said molding blocks 2 and water collection plates 3 are respectively inserted into receptacles at the internal side of the side plates 13 of the water tank, which have a limited freedom of motion in the longitudinal transverse and vertical directions.

The number of said molding blocks 2 is 5-30. As shown in FIGS. 1 and 2, the number of said molding blocks 2 is 14 according to this embodiment.

The number of said water collection plates is 3-28. As shown in FIGS. 1 and 2, the number of said water collection plates 3 is 9 according to this embodiment.

Figure 4:
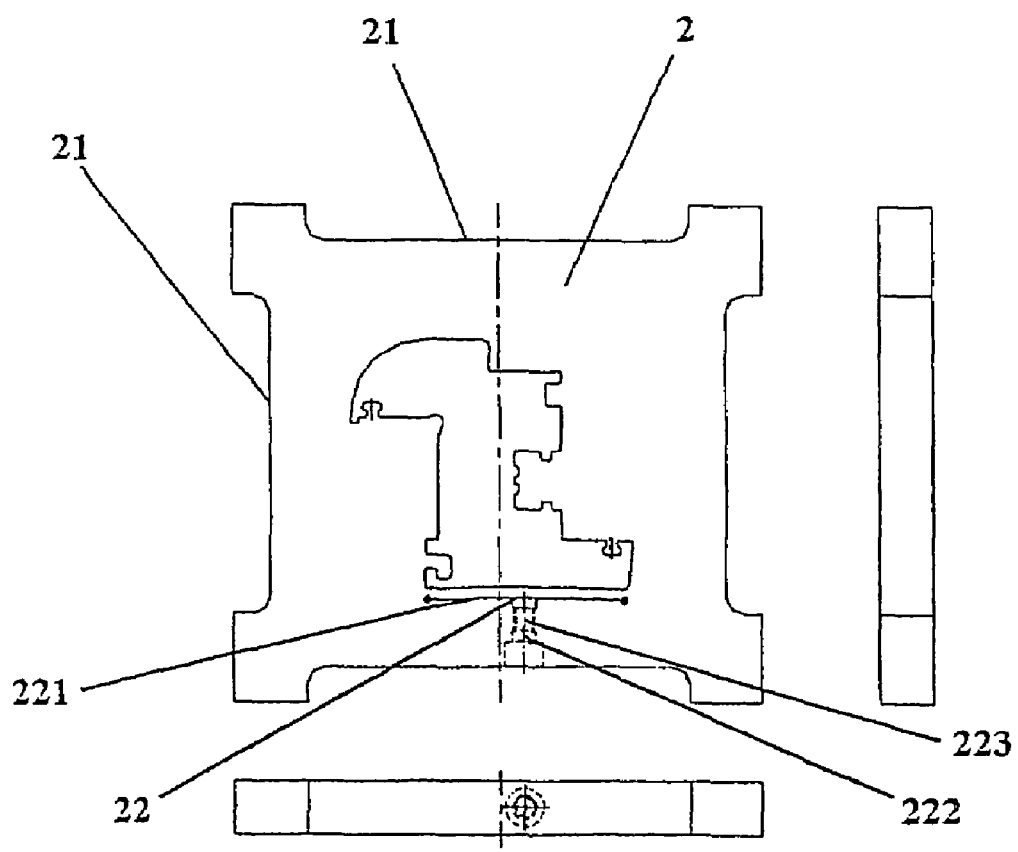
FIG. 4 is a front view, a bottom view and a left view of a molding block.

As shown in FIG. 4, a flat U-shape water passage slot 21 is provided on each periphery side of said molding blocks 2.

The width of said U-shape water passage slot 21 is 0.2-0.8 of the side length of the molding block 2, the depth of which is ranged 2-15 mm according to the size of the molding blocks. In this embodiment, the width of said U-shape water passage slot 21 is about 0.7 of the side length of the molding block 2, the depth of which is designated as 8 mm.

As shown in FIG. 4, an adjusting mechanism 22 is provided on the long side of the profile cavity passage of said molding block 2. The adjusting mechanism 22 includes a through kurf 221 which is parallel to and 1-8 mm from the plane of the long side of the profile cavity passage, and at least one through screw hole 222 which is provided on the plane of the long side, such as a screw hole 222 according to this embodiment. Said screw hole 222 is perpendicular to the plane of the long side and intersects with the lower side of the kurf 221, wherein an adjusting screw 223 is engaged with the screw hole 222 and the top of the adjusting screw 223 may extend against the upper side of said kurf 221. When the profile cavity passage of the molding block 2 does not have a long side, an adjusting mechanism 22 may not be provided. When the profile cavity passage of a molding block 2 has more than one long sides, more than one adjusting mechanisms 22 may be provided respectively according to the locations of the long sides. When a long side is very long, a kurf 221 is very long too, so two or more screw holes 222 and adjusting screws 223 may be provided.

The width of said kurf is 0.1-2.0 mm, and the length of said kurf is equal to that of the long side of the profile cavity passage, or a little longer or shorter.

Figure 5:
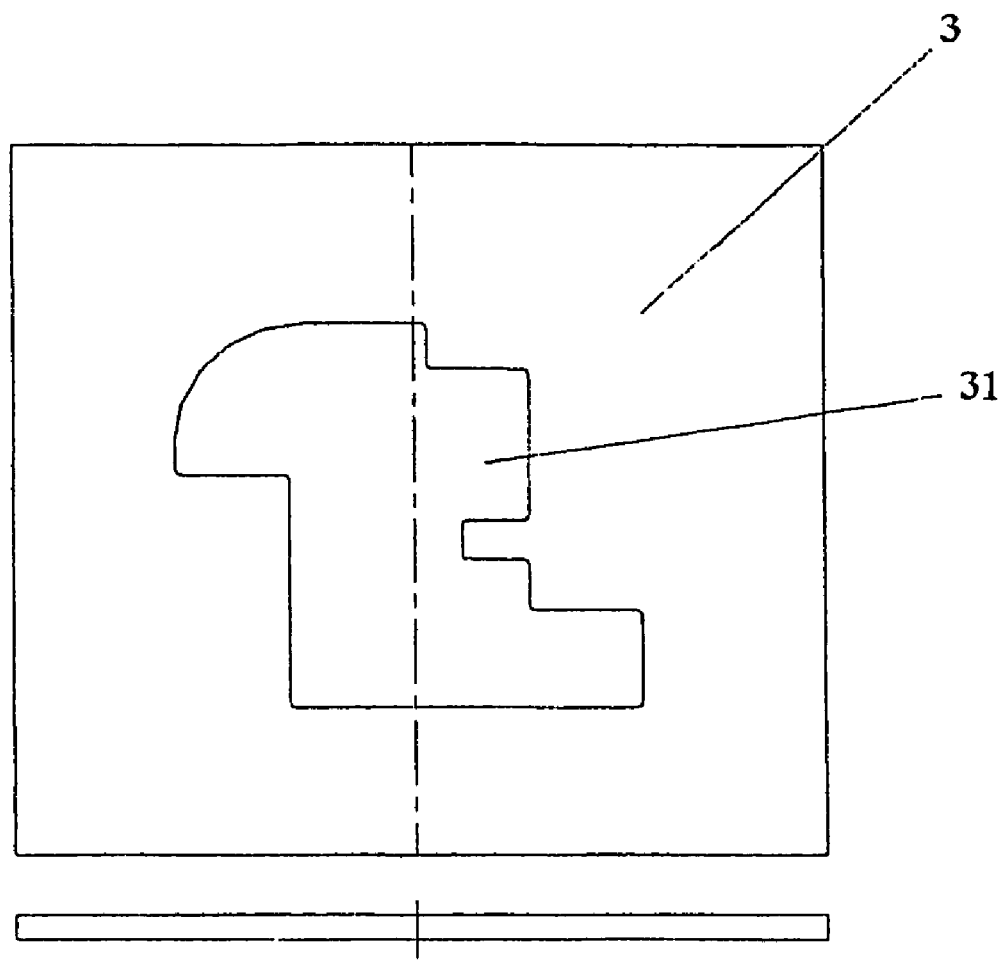
FIG. 5 is a front view and a bottom view of a water collection plate.

As shown in FIG. 5, the shape of an internal cavity 31 of said water collection plate 3 is the shape of an outwardly expanded section of a plastic complicated profile (profile cavity passage) which expands 0.5-8 mm in the radial direction. The shape of some parts of the internal cavity 31 of the water collection plate 3 where are overlapped, adjacent, or complicated can be simplified. In the present embodiment, the radial expansion distance is 5 mm, and the shape of the internal cavity is simplified so as to facilitate water passage, as is the simplified shape of an internal cavity shown in FIG. 5.

Said water collection plate 3 can be made of stainless steel, alloy aluminum, organic glass, or other stainless and corrosion resistant materials. In the present embodiment, the water collection plate 3 is made of stainless steel.

In extrusion, a plastic complicated profile enters the front end block 11 of the water tank 1 along the A direction shown in FIG. 1. When the profile gradually becomes shaped through molding blocks 2 and water collection plates 3, the cooling water firstly passes through the U-shape water passage slots 21 disposed around the molding plate 2, then through a gap with a width of 0.5-8 mm between the profile and the internal cavity 31 of the water collection plate 3, then through the U-shape water passage slots 21 disposed around the next molding plate 2, then through a gap with a width of 0.5-8 mm between the profile and the internal cavity 31 of a water collection plate 3, and continues to circulate as described above, as is shown using arrows in FIG. 1 and FIG. 2, because molding plates 2 and water collection plates 3 are spaced from each other in the tank body 1, and the intervals therebetween become wider from the front end to the rear end. Thus, the cooling water flow forms an periphery-inner circle-periphery alternate flow cycle. Also, because the cooling water passes evenly along the outer surface of the profile when passing through the internal cavity 31 of the water collection plate 3, the profile can be cooled homogeneously and high efficiently in a high-speed extrusion. Good profiled effect and quality can be sufficiently guaranteed in a high-speed extrusion because of the high cooling efficiency.

What is claimed is:

1. A cooling and molding water tank for extrusion of a plastic complicated profile, comprising a tank body including a front end block, a rear end block, a top cover, two side plates, a bottom plate and a plurality of foot plates which are in bolted or hinged joint, wherein an inlet pipe is provided on the side plate of the water tank near the front end block, an outlet pipe is provided on the side plate of the water tank near the rear end block, and a vacuum valve and a vacuum gauge are provided on the top cover of the water tank, characterized in that a plurality of molding blocks and water collection plates are provided along the length direction inside the tank body, said molding blocks and water collection plates being spaced from each other, wherein at least a water passage is provided at a periphery of each of said molding blocks and an internal cavity is provided in each of said water collection plates such that said cooling water flows through said tank in a periphery-inner circle-periphery pattern, said internal cavity has a shape similar to that of said profile and a dimension larger than a peripheral dimension of said profile such that a gap of 0.5-8 mm is formed between the internal cavity of said water collection plate and said profile, whereby said profile is cooled homogeneously by said cooling water passing through said internal cavity.

2. A cooling and molding water tank for extrusion of a plastic complicated profile of claim 1, wherein said molding blocks and water collection plates are inserted into a receptacle at the internal side of the side plates of the water tank, which have a limited freedom of motion in the longitudinal, transverse and vertical directions.

3. A cooling and molding water tank for extrusion of a plastic complicated profile of claim 1, wherein the number of said molding blocks is 5-30.

4. A cooling and molding water tank for extrusion of a plastic complicated profile of claim 1, wherein the number of said water collection plates is 3-28.

5. A cooling and molding water tank for extrusion of a plastic complicated profile of claim 1, wherein said water passage is a U-shaped slot at a periphery of each of said molding blocks.

6. A cooling and molding water tank for extrusion of a plastic complicated profile of claim 5, wherein the width of said U-shaped water passage slots is 0.2-0.8 of the side length of the molding block, the depth of which ranges from 2-15 mm according to the size of the molding blocks.

7. A cooling and molding water tank for extrusion of a plastic complicated profile of claim 1, wherein an adjusting mechanism provided on the long side of the profile cavity passage of said molding blocks, said adjusting mechanism including a through kurf which is parallel to and 1-8 mm from the plane of the long side of the profile cavity passage, and at least one through screw hole which is provided on and perpendicular to the plane of the long side, and intersects with the lower side of the kurf, wherein an adjusting screw is engaged with the screw hole and the top of the adjusting screw may extend against the upper side of said kurf.

8. A cooling and molding water tank for extrusion of a plastic complicated profile of claim 7, wherein the width of said kurf is 0.1-2.0 mm, and the length of said kurf is equal to that of the long side of the profile cavity passage, or a little longer or shorter.

9. A cooling and molding water tank for extrusion of a plastic complicated profile of claim 1, wherein said water collection plates can be made of stainless steel, alloy aluminum, organic glass, or other stainless and corrosion resistant materials.

10. A cooling and molding water tank for extrusion of a plastic profile, comprising a tank body having a front end block and a rear end block, an inlet pipe near the front end block and an outlet pipe near the rear end block for providing a cooling water to flow through said tank body along a longitudinal direction, and a plurality of molding blocks provided inside the tank body, wherein a plurality of water collection plates are provided inside the tank body, each having an internal cavity in a similar shape to that of said plastic profile and with a lateral dimension larger than an peripheral dimension of said plastic profile, thereby forming a substantially uniformed gap between said water collection plates and said plastic profile to allow said cooling water passing said internal cavity to cool said profile homogeneously, wherein at least one water passage is provided at a periphery of each of said molding blocks to allow said cooling water to pass therethrough such that said cooling water flows through said tank in a periphery-inner circle-periphery pattern.

11. The cooling and molding water tank of claim 10, wherein said water collection plates are arranged to be spaced from said molding blocks along said longitudinal direction.

12. The cooling and molding water tank of claim 11, wherein said water collection plates are arranged to be in an alternative pattern with said molding blocks.

13. The cooling and molding water tank of claim 11, wherein said molding blocks and said water collection plates are arranged to be more dense from the rear end block toward the front end block.

14. The cooling and molding water of claim 10, wherein said water passage is a U-shaped slot provided at said periphery of said each molding block.

15. The cooling and molding water tank of claim 10, wherein said lateral dimension of said internal cavity of said water collection plates is 0.5-8 mm larger than said peripheral dimension of said plastic profile.

16. The cooling and molding water tank of claim 10, wherein said plastic profile has a complicated contour.

17. A cooling and molding water tank for extrusion of a plastic profile, comprising a tank body having a front end block and a rear end block, an inlet pipe near the front end block and an outlet pipe near the rear end block for providing a cooling water to flow through said tank body along a longitudinal direction, and a plurality of molding blocks provided inside the tank body, wherein a plurality of water collection plates are provided inside the tank body, each having an internal cavity for said profile and said cooling water to pass therethrough, whereby said profile is cooled homogeneously by said cooling water, wherein a water passage is provided at a periphery of each of said molding blocks to allow said cooling water to pass therethrough and flow in said tank in a periphery-inner circle-periphery pattern.

18. The cooling and molding water tank of claim 17, wherein said internal cavity of said water collection plates has a shape similar to that of said plastic profile and with a lateral dimension larger than an peripheral dimension of said plastic profile, thereby forming a substantially uniformed gap between said water collection plates and said plastic profile.

19. The cooling and molding water tank of claim 17, wherein said water passage is a U-shaped slot provided at the periphery of said each of said molding blocks.

* * * * *